P. L. SWINE.
Package Case for Plants.

No. 56,290.

Patented July 10, 1866.

Witnesses:

Inventor:

UNITED STATES PATENT OFFICE.

P. L. SUINE, OF SHIRLEYSBURG, PENNSYLVANIA.

IMPROVEMENT IN PACKAGE-CASES FOR PLANTS.

Specification forming part of Letters Patent No. 56,290, dated July 10, 1866.

*To all whom it may concern:*

Be it known that I, P. L. SUINE, of Shirleysburg, Huntingdon county, State of Pennsylvania, have invented a new and Improved Package-Case; and I do hereby declare that the following is a full, clear, and exact description thereof, which will enable others skilled in the art to make and use the same, reference being had to the accompanying drawings, forming part of this specification.

The present invention relates to a new and improved package-case especially designed to be used for the transportation and carrying of plants, although it can be applied as well and to much advantage in the carrying or transportation of other and various articles, as will be obvious from the following detail description thereof, reference being had to the accompanying plate of drawings, in which—

Figure 1:
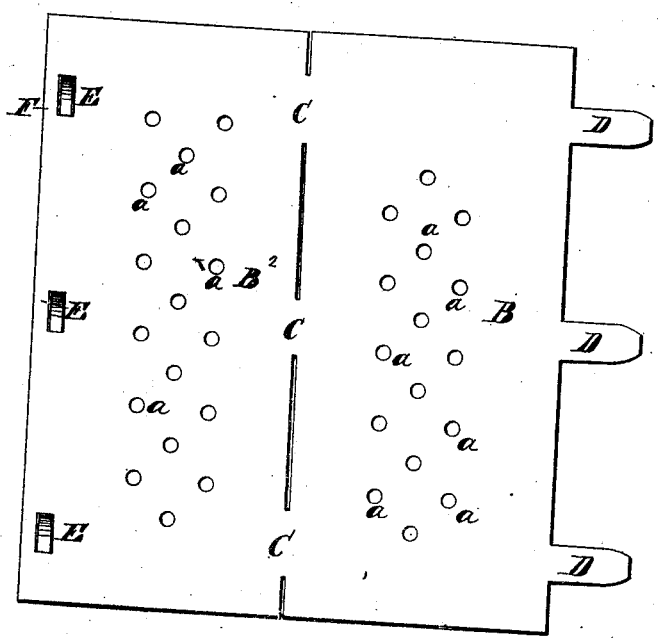
Figure 2:
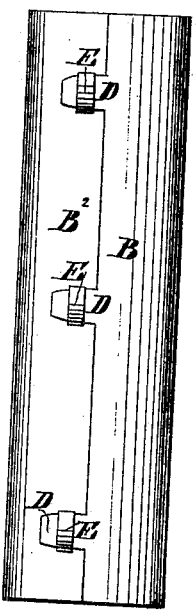
Figure 3:
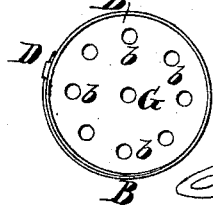

Figure 1 is a view showing the package-case when spread out; Fig. 2, a side view of the same when shut or closed, and Fig. 3 a view of one end in the form shown in Fig. 2.

Similar letters of reference indicate like parts.

A in the drawings represents a sheet of metal or other suitable thin and flexible material consisting of two sections, B B$^2$, connected together at the points or parts C in the same line with each other, produced by partially cutting the sheet metal, as plainly shown in the drawings, thereby forming a hinge-joint to the two sections. Each section, B B$^2$, has a series of fine perforations or apertures, *a*, at suitable distances apart, and the one, B, is provided with three or more clips or projecting pieces, D, along one of its edges, corresponding to which in position are cut or formed loops E in the other section, B$^2$, along and near its edge F, in and under which loops, when the two parts are bent around and into a cylindrical shape, as shown in Fig. 2, the said clips are passed and then bent over, thereby firmly binding and holding the two parts together and in such shape. Each end of the plate A has a cap-plate or disk, G, secured to one of its sections or parts by soldering, or in any other proper manner, of suitable shape that, when the plate is bent over and around into a cylindrical shape, they will form the heads or end coverings thereto, while at the same time they will allow the plate-sections to be opened from each other. These head-plates are perforated with a series of apertures, *b b*. (See Fig. 3.)

From the above description of the construction of my improved package-case it is plainly apparent that it is particularly applicable to the transportation or carrying of plants, although it can be applied for other and various articles, the expense of manufacture being extremely light, and a practical and perfect package-case secured.

I claim as new and desire to secure by Letters Patent—

A package-case made substantially as herein described, for the purposes specified.

P. L. SUINE.

Witnesses:
B. R. FOUST,
WILLIAM T. SHEAFFER.